United States Patent [19]
Wenz

[11] Patent Number: 5,507,849
[45] Date of Patent: Apr. 16, 1996

[54] INDIVIDUAL CAVITY ADJUSTMENT TONG HEAD ASSEMBLY

[75] Inventor: William Wenz, Millville, N.J.

[73] Assignee: Jeff Company, Inc., Millville, N.J.

[21] Appl. No.: 121,482

[22] Filed: Sep. 16, 1993

[51] Int. Cl.$^6$ .................................................. C03B 9/44
[52] U.S. Cl. ........................... 65/260; 65/239; 65/241; 92/165 R; 92/193; 294/88
[58] Field of Search .............................. 65/260, 239, 241, 65/323, 375, 171, 172, 173; 92/165 R, 193, 248; 294/88; 403/384, 337

[56] References Cited

U.S. PATENT DOCUMENTS

| | | | |
|---|---|---|---|
| 1,859,956 | 5/1932 | Canfield . | |
| 2,899,232 | 8/1959 | Walter, Jr. | 294/88 |
| 3,790,205 | 2/1974 | Wenz | 294/88 |
| 4,185,985 | 1/1980 | Wenz | 65/172 |
| 4,653,339 | 3/1987 | Komatsu et al. | 92/193 |
| 4,710,218 | 12/1987 | Giberti-Fornaciari | 65/260 |
| 4,981,070 | 1/1991 | Larsen | 92/193 |
| 5,222,429 | 6/1993 | Garman et al. | 92/193 |

FOREIGN PATENT DOCUMENTS 2091242  7/1982  United Kingdom ............... 65/260

*Primary Examiner*—David L. Lacey
*Assistant Examiner*—Steven P. Griffin
*Attorney, Agent, or Firm*—Norman E. Lehrer; Jeffrey S. Ginsberg

[57] ABSTRACT

A tong head assembly for a glass blowing machine includes multiple tong mechanisms. Each tong mechanism has a tong extending from the bottom of a cylinder. The tongs are adapted to grasp a blown container. The cylinders are mounted for independent rectilinear and angular movement in the tong head assembly in order to compensate for misalignment of the tongs with the glass container to be grasped.

10 Claims, 2 Drawing Sheets

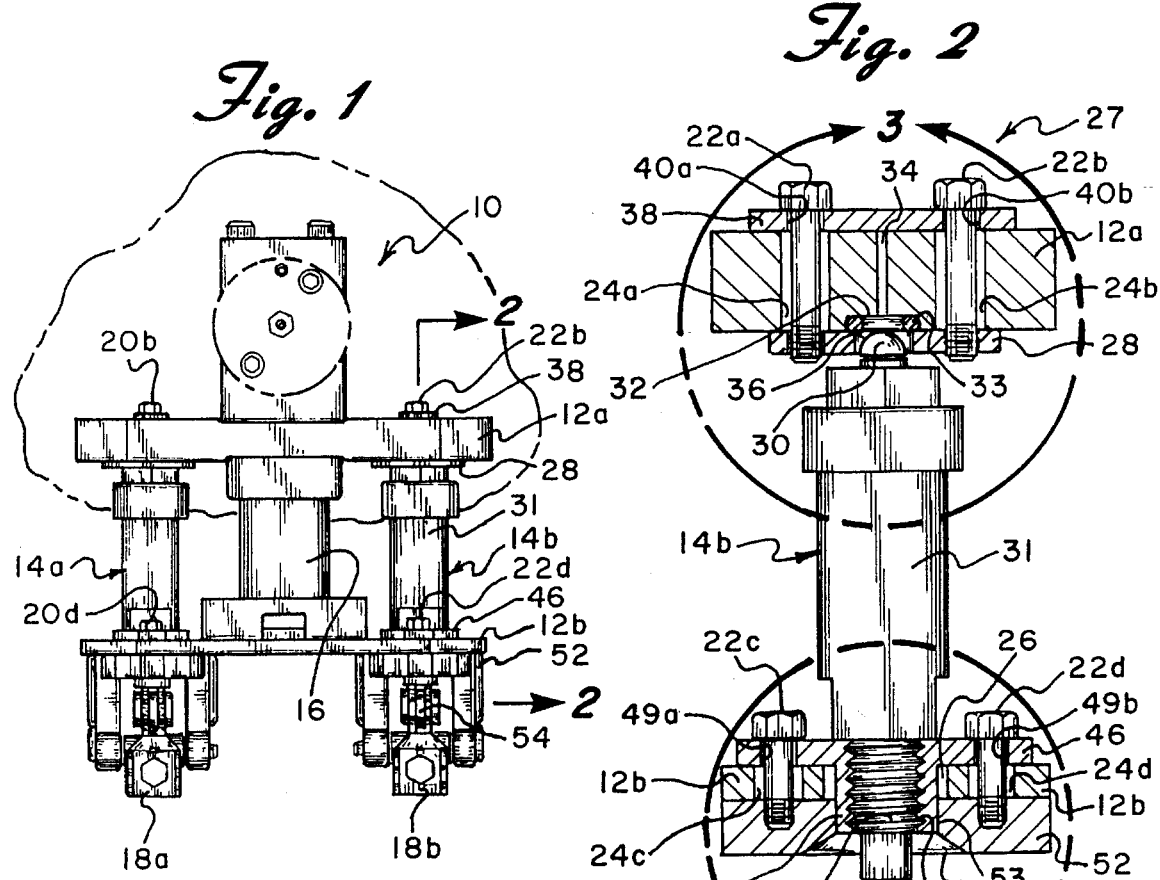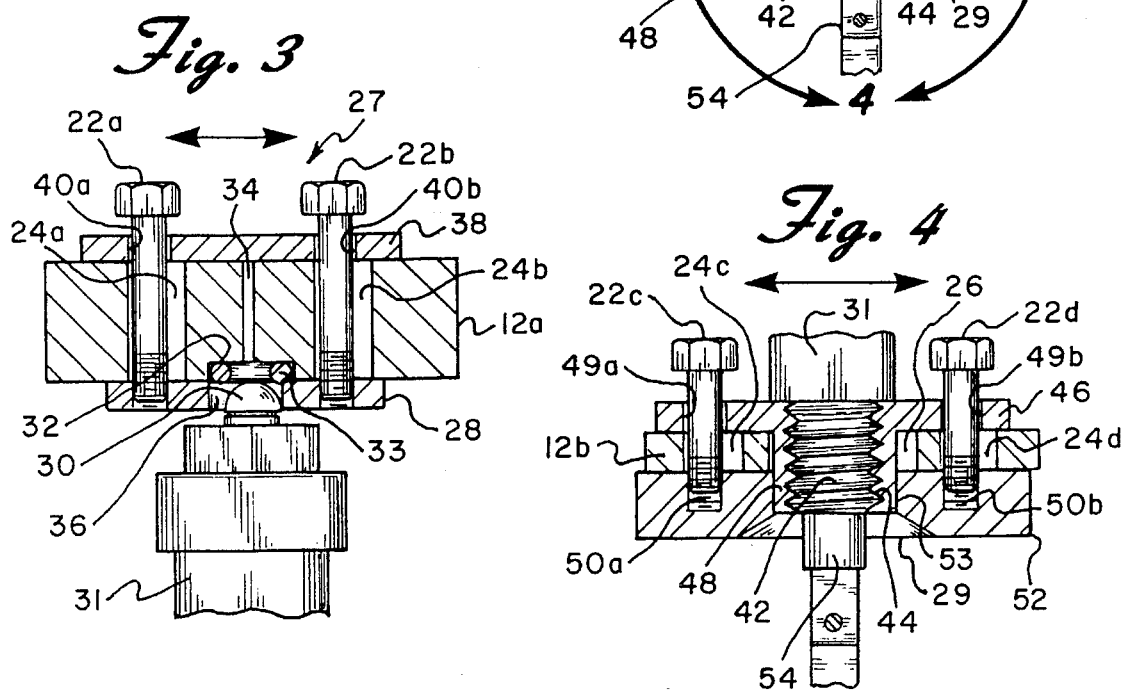

INDIVIDUAL CAVITY ADJUSTMENT TONG HEAD ASSEMBLY

BACKGROUND OF THE INVENTION

This invention is directed toward glass molding equipment, and more particularly, to an improved tong head assembly which allows for individual correction of misalignments between the grasping tongs of the assembly and the glass containers subjected to the grasping.

Tong head assemblies are used in glass molding equipment for grasping formed glass bottles and the like and moving the same from one position to another. The tong head assemblies are pneumatically driven such that a tong extending from the lower end of the assembly is caused to open and close onto a glass container or the like. The tong head assemblies employ a pneumatic cylinder located in a body member which is connected at its free end to a grasping tong. Upon movement of the cylinder, via air pressure or the like, the tongs are opened and closed for facilitating the grasping movement.

Frequently, and in most tong head assemblies, there are a plurality of cylinders having tongs thereon which are each adapted to grasp an individual glass container. As such, the individual cylinders and tongs must be in alignment with the glass containers which pass underneath the tong head assembly. Essentially, this alignment is established by the layout of the molds for the glass containers as well as the sizing of the tong head assembly and positioning of the individual cylinders thereon. However, as is inherent in all mechanical designs, tolerances, wear and the like inevitably add up to the loosening and relative movement of the parts of machines. As such, after this movement, the cylinder and grasping tongs tend to be out of alignment with the positions of the glass containers that the individual tong assemblies are adapted to grasp. Such movement adds up to the misalignment and the inability of the tong to grasp its respective glass container properly, thereby forming checks in the glassware or eventually breaking the same. Following from the aforementioned problems, the prior art includes a tong head assembly invention which allows for minor adjustments for aligning the tongs with their respective line of glass container positions.

U.S. Pat. No. 4,710,218 to Giberti-Fornaciari discloses a take-out tong head assembly. The take-out tong head assembly of this invention has means for adjusting the tongs. As such, the cylinders and tongs can be loosened from the body of the tong head assembly so that the tongs can be moved relative to the body so as to make the necessary adjustments for alignment. The bolts can be tightened for securing the tongs in the proper position. However, because the tongs of the Giberti-Fornaciari invention are substantially connected via the body of the assembly, both tongs of the assembly must be moved together to establish the proper adjustment. That is, movement of one tong in the lateral direction also moves the other tong. Because of this connection, independent tong adjustment for alignment with the position of its respective glass container is not possible. By moving one tong into position, it is possible, because of the interconnection of the two, to move the other tong out of position. Therefore, adjustments for perfect alignment of a tong with the glass containers to be grasped can be difficult or impossible.

Similarly, U.S. Pat. Nos. 4,185,985 to Wenz; 3,559,425 to Erwin et al.; and 1,859,956 to Canfield each disclose take-out assemblies for grasping and transporting glassware from a first position to a second position. However, none of these inventions discloses means for adjusting the take-out assemblies for correcting for misalignment with the subject glassware.

SUMMARY OF THE INVENTION

The present invention is directed toward a tong head assembly having a plurality of cylinder piston and tong mechanisms, wherein each cylinder and tong can be individually and exclusively adjusted to compensate for misalignments of the tong with the position of its designated glass container.

In its simplest form, the invention is comprised of a tong head assembly which includes two grasping heads and two cylinders attached to the heads. The cylinders are attached to the body of the tong head assembly which is comprised of upper and lower elongated flat plates which are spaced apart by a substantially cylindrically shaped support wherein the cylinders are located on either side of the same. Each cylinder is attached to the two-plate body via openings through the lower plate and bolts extending through both plates and into additional slide plates attached to the cylinder body. The bolts extend from both the upper and lower plates and into the upper and lower slide plates.

The holes through which the cylinders extend and the holes through which the bolts extend are substantially greater in diameter than the diameter of the cylinder and of the bolts, respectively. Accordingly, the additional space provided by these holes allows for movement of each cylinder and tong within the two-plate body member. Because of the precise design of the tong head assembly, potential misalignment is substantially minimal. Therefore, the space provided by the oversized holes for the bolts and cylinders in the two plates allows for sufficient movement of the cylinder and tongs therein to adjust for any misalignments of the tongs with respect to their designated glass containers.

If, upon operating the tong head assembly, it is apparent that the tong is out of alignment with its targeted container position, both the upper and lower bolts securing the cylinder and tong into position within the plates can be loosened. After loosening, the cylinders and tongs can be moved into proper position for facilitating direct alignment of the same with the glass containers. Upon alignment, both the upper and lower bolts are tightened for securing the cylinders at the adjusted position and the tong head assembly can be used to properly transport the glass containers from a first position to a second position.

In addition to the above, this invention also includes a means for increasing the durability of the piston or shaft via a supplemented wear ring. Accordingly, a wear ring is incorporated onto the shaft and is supplemented by a resilient ring which lies adjacent and behind the wear ring on the shaft. The wear ring functions as a buffer between the cylinder housing and piston for decreasing wear thereto due to contact between the piston and housing. The resilient ring functions to absorb the forces associated with the wear ring contacting the inner surface of the cylinder housing, thereby increasing the life of the wear ring and subsequently the life of the cylinder shaft.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a front elevational view of the tong head assembly incorporating two individually adjustable cylinder piston and tong mechanisms;

FIG. 2 is a cross-sectional view taken along line 2—2 of FIG. 1 showing the cross-section of an individual cylinder piston and tong mechanism;

FIG. 3 is an enlarged view taken from line 3 of FIG. 2;

FIG. 4 is an enlarged view taken from line 4 of FIG. 2;

DETAILED DESCRIPTION OF THE PREFERRED EMBODIMENT

Figure 5:
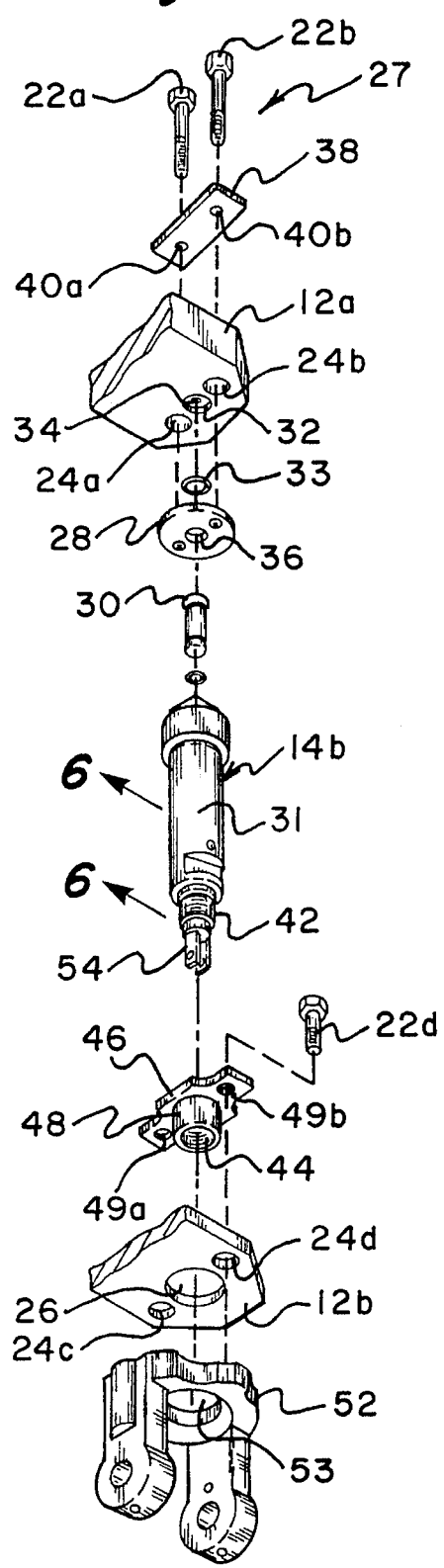
FIG. 5 is an exploded view showing the assembly of one cylinder piston and tong mechanism.

Referring now to the drawings in detail wherein like reference numerals have been used throughout the various figures to designate like elements, there is shown in FIG. 1 a front elevational view of the individual cavity adjustment tong head assembly constructed in accordance with the principles of the present invention and designated generally as 10. The individual adjustment tong head mechanism is comprised essentially of the body member plates 12a and 12b, the cylinder piston and tong mechanisms 14a and 14b and the support 16.

The body member plates 12a and 12b are essentially elongated plates having holes therethrough for facilitating engagement with the cylinder piston and tong mechanisms 14a and 14b. The plates and the rest of the tong head assembly are comprised of steel or other suitable metal. The plates are of a length so as to space the tongs 18a and 18b sufficiently away from each other and in alignment with the designated glass container for which they are adapted to grasp and move to another location. The upper plate 12a is of a substantially greater thickness than the lower plate 12b, but they are of equivalent length. The cylinder piston and tong mechanisms 14a and 14b are secured to and between the plates via bolts. Bolts 20b and 20d as well as two other similar bolts (not shown) are used to secure the cylinder piston and tong mechanism 14a to the upper and lower plates 12a and 12b and four other bolts 22a through 22d are used to secure the cylinder piston and tong mechanism 14b to the upper and lower plates 12a and 12b. Accordingly, both the upper and lower plates have two holes therethrough at each end of the plate for insertion of the bolts therethrough for engagement with the cylinder piston and tong mechanisms.

Referring now to FIGS. 2–5, the cylinder piston and tong mechanism will be described in detail as will the adjustment mechanism. Because both cylinder piston and tong assemblies 14a and 14b are substantially the same, only one mechanism 14b will be described in detail, it being understood that the description applies equally to cylinder piston and tong mechanism 14a and its accompanying parts.

The individual cavity adjustment feature of the instant invention is comprised essentially of the bolt holes 24a and 24b through upper plate 12a and bolt holes 24c and 24d through lower plate 12b being essentially oversized, and the cylinder insertion hole or cavity 26 being oversized as well. That is, because the bolts 22a through 22d are used to secure the cylinder piston and tong mechanism to the body plates 12a and 12b, the holes having the extra room therein allow the assembly to be adjusted in a rectilinear and angular fashion by using this extra space. Similarly, cylinder insertion cavity 26 is used for receiving a cylinder 31 and the extra room therein allows for rectilinear adjustment of the cylinder. A further discussion on this adjustment feature first requires a detailed description of the manner in which the cylinder piston and tong mechanism 14b is attached to the upper and lower plates 12a and 12b.

The cylinder piston and tong mechanism 14b is attached at its upper end 27 to the upper plate 12a via the use of a circular first slide plate 28. The slide plate 28 has threaded holes therein for alignment with the bolts 22a and 22b and for engagement thereof. The slide plate 28 also has a hole through the center for engagement with the head 30 extending from the top portion of the cylinder 31. The head 30 is essentially an elongated rod having a dome-shaped top which is screwed into the top of the cylinder 31. In addition, the head 30 has a hole through the center thereof for directing air pressure to the cylinder area. The upper surface of the slide plate 28 lies adjacent the bottom portion of the body member 12a.

There is a recess 32 in the lower side of the body member plate 12a centered between the bolt holes 24a and 24b. The recess is of a size and shape for engaging a sealing O-ring 33 which is designed to abut the first slide plate 28 on its upper surface and seal the passageway formed by the port 34, the head 30 and the plates 12a and 28. The head 30 does not extend all the way through the hole 36 in the first slide plate 28 and is of a diameter less than the inner circle formed by the O-ring 33. The adjustment feature of this invention includes the use of the first slide plate 28 and a second slide plate 38. As discussed before, the holes 24a and 24b are substantially greater in diameter than the diameter of the bolts 22a and 22b. The second slide plate 38 is substantially rectangular in shape and has two clearance holes 40a and 40b therethrough for the bolts 22a and 22b to extend.

The second slide plate 38 acts as an interface between the heads of the bolts 22a and 22b and the larger openings 24a and 24b. The threaded portions of the bolts extend through the holes 24a and 24b and as shown in FIG. 3, engage the threads in the first slide plate 28. The upper portion of the cylinder piston and tong mechanism 14b can be adjusted in a rectilinear fashion to the left and to the right and or back and forth, as shown in FIG. 3, by using the extra space provided by the larger holes 24a and 24b. Therefore, when it is desired that the cylinder piston and tong mechanism 14b be moved, the bolts 22a and 22b are loosened such that the upper and lower slide plates 28 and 38, respectively, can be moved in either direction along with the cylinder 31 and head 30. When the proper position is reached on the upper portion of the cylinder piston and tong assembly, the bolts 22a and 22b can be tightened back down to secure the assembly in this position. The bottom portion of the cylinder piston and tong mechanism is adjusted in a manner similar to the upper portion.

The bottom portion of the cylinder piston and tong mechanism and lower plate 12b are shown in FIG. 4. At the lower end 29 of the cylinder piston and tong mechanism 14b, a threaded portion 42 extends from the cylinder 31, shown also in FIG. 5. The lower threaded portion 42 engages the threads 44 in the guide plate 46. The guide plate 46 is substantially rectangular in shape, having a cylindrically-shaped portion 48 extending downward from the center thereof as shown in FIG. 4. This cylindrically-shaped inner portion 48 extends into the hole 26 in the lower body member plate 12b. However, as shown in FIG. 4, the cylindrical extension 48 is of a substantially lesser diameter than the hole 26 in the lower plate 12b.

In addition to the cylindrical extension, the guide plate 46 has clearance holes 49a and 49b therethrough for receiving the bolts 22c and 22d. The bolts 22c and 22d extend through the clearance holes 49a and 49b and into the substantially larger diameter holes 24c and 24d in the lower body member plate 12b. The bolts 22c and 22d extend through these holes and into threaded holes 50a and 50b in the tong holding plate 52 which extends below and adjacent the body member plate 12b. The tong holding plate 52 has a hole 53 therein for fitting the cylindrical extension 48 and a chamfer on the opposite side wherein the lower portion 54 of the cylinder piston and tong mechanism 14b extends. The lower portion 54 of the cylinder piston and tong mechanism 14b attaches to the tong 18b, shown in FIG. 1.

Similar to the upper plate adjusting mechanism, the lower plate adjusting mechanism functions by using the larger diameters of the holes 24c, 24d and 26 in the lower body member plate 12b. The lower portion of the cylinder piston and tong mechanism can be adjusted by unloosening the bolts 22c and 22d and moving the guide plate 46 and tong holding plate 52 relative to the lower body member plate 12b by using the extra longitudinal space provided by oversized holes 24c, 24d and 26. Upon proper adjustment and alignment of the cylinder piston and tong mechanism with the glass container or the like, the bolts 22c and 22d can be tightened into the tong holding plate 52 for securing the cylinder piston and tong mechanism 14b in proper alignment with its respective glass container.

Figure 6:
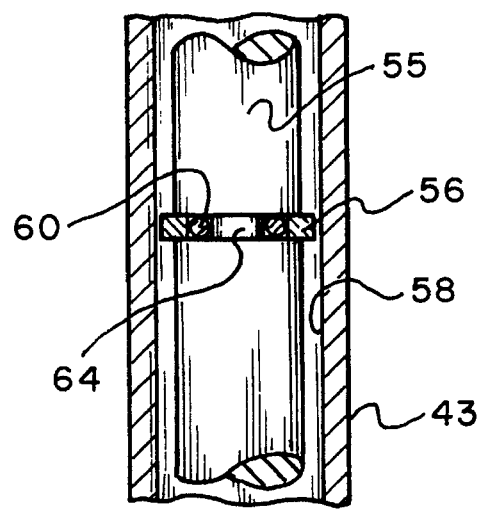
FIG. 6 is a cross-sectional view taken along line 6—6 of FIG. 5.
Figure 7:
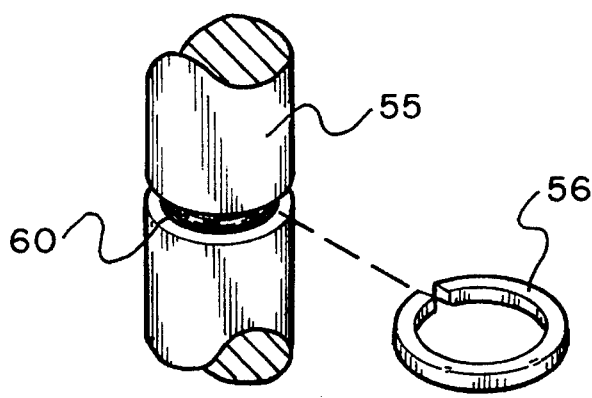
FIG. 7 is a perspective, exploded view of the cylinder and its wear and O-rings.

In addition to the aforementioned adjustment improvements and referring to FIGS. 6 and 7, the cylinder 31 itself has been improved so as to decrease the wear of the piston rod or shaft 55 of the cylinder 31.

A wear ring 56 protects the shaft 55 and housing 58 from wear by acting as a buffer between them. Therefore, instead of the shaft possibly contacting the housing 58, the non-abrasive wear ring 56 makes contact. Therefore, the wear ring 56 becomes subject to direct and damaging forces from contact with the housing 58. This damaging wear to the wear ring is compensated for herein where, as shown in FIG. 6, an O-ring 60 and the wear ring 56 are attached to the cylinder piston rod or shaft 55 with the O-ring lying adjacent to and underneath the wear ring 56 for absorbing contact forces.

The wear ring 56 and O-ring 60 are attached to the shaft 55 via a recess 64 machined into the piston rod or shaft 55 for to engaging the O-ring 60. The O-ring 60 has an outside diameter smaller in size than the outside diameter of the piston rod or shaft 55 such that when the O-ring 60 is installed in the recess 64, the recess is not completely filled. The wear ring 56 has an inside diameter substantially less than the outside diameter of the piston rod or shaft 55 and a width which fits into the recess 64. Therefore, the wear ring 56 fits over the O-ring 60, via the split therein, and lies adjacent thereto, as shown in FIG. 7. As such, when the wear ring 56 is in operation, that is when it is moving up against the side wall or housing 58 of the cylinder 43, the O-ring 60 absorbs a substantial amount of the force associated with the wear ring being forced up against the housing 58. The O-ring 60 is made of a resilient material. The resilient nature of the O-ring allows the wear ring 56 and hence the cylinder piston rod or shaft 55 and other moving parts to function properly for a longer period of time.

The tong head assembly 10 is used similar to any other tong head assembly wherein the tongs 18a and 18b are aligned with the glass containers or the like so as to transfer the same to another position. As discussed, the alignment between the tongs and the glass containers or the like is substantially inherently a part of the design of the entire machine. However, when slight misalignments occur due to wear of the parts and/or tolerance build up, the tong head assembly of the instant invention can be adjusted to compensate for the same.

Each individual cylinder piston and tong mechanism can be adjusted to compensate for misalignment by unloosening bolts 22a–22d on the upper and lower body member plates 12a and 12b and adjusting the position of the cylinder 31 and tong 18b with respect to the glass container. When the adjustment is complete, the bolts 22a–22d can be tightened to secure the cylinder 31 and tong 18b into the proper position. Because of the exclusive and independent nature of the adjustment features, one cylinder piston and tong mechanism can be adjusted for misalignment without affecting the alignment of another cylinder piston and tong mechanism.

The present invention may be embodied in other specific forms without departing from the spirit or essential attributes thereof and accordingly reference should be made to the appended claims rather than to the foregoing specification as indicating the scope of the invention.

What is claimed is:

1. A tong head assembly including multiple mechanisms wherein each of said mechanisms is comprised of a cylinder and a corresponding tong, each of said tongs being constructed to grasp a glass container, each of said mechanisms having adjustment means for rectilinearly and angularly adjusting the same independently of each of the other mechanisms to compensate for misalignment of its corresponding tong with said container to be grasped, and said assembly further comprising means for securing said mechanisms to said adjustment means, said adjustment means including a body member having a bottom, top and oversized cavities formed therein for receiving said cylinders and having oversized holes formed therethrough for receiving said securing means, said cylinders being rectilinearly movable within said cavities and said securing means being rectilinearly movable within said holes for facilitating the adjustment and alignment of said mechanisms with respect to said glass containers.

2. The assembly according to claim 1 wherein said securing means includes bolts for securing and unsecuring said mechanisms to allow for adjustment and alignment of said tongs with said containers.

3. The assembly according to claim 2 wherein each of said mechanisms have an upper end and a lower end, said bolts securing said mechanisms at said upper and lower ends.

4. The assembly according to claim 3 wherein said securing means further comprises a first sliding plate positioned adjacent the bottom of said body member and a second sliding plate positioned adjacent the top of said body member, said cylinders engaging said first plate, said bolts extending through said second plate and also engaging said first plate.

5. The assembly according to claim 3 wherein each of said mechanisms further includes a guide plate and a tong holding plate, each of said tong holding plates being positioned at said lower end of a corresponding one of said mechanisms adjacent said body member, said guide plate engaging said cylinder, said bolts of said securing means extending through said guide plate, said tong holding plate engaging said tong and said bolts.

6. The assembly according to claim 1 wherein said body member comprises an upper and lower body plate and a support located therebetween, said cylinders extending between said upper and lower body plates and on each side of said support.

7. The assembly according to claim 1 wherein each of said cylinders comprises a shaft surrounded by a housing and wear means attached to said shaft adjacent said housing for guiding said shaft in said housing and reducing wear thereof, said wear means including resilient means for absorbing forces between said wear means and said housing.

8. The assembly according to claim 7 wherein said wear means comprises an O-ring fitting into a groove which spans the circumference of said shaft and a wear ring fitting over and adjacent to O-ring and into said groove.

9. The assembly according to claim 8 wherein said O-ring is formed from a material having resilient properties.

10. The assembly according to claim 1 wherein each of said cylinders, cavities, securing means and holes have a predetermined diameter, the diameters of said cylinders being substantially less in size than the diameters of said cavities and the diameters of said securing means being substantially less in size than the diameter of said holes.

* * * * *